US 6,517,000 B1

United States Patent
McAllister et al.

(10) Patent No.: US 6,517,000 B1
(45) Date of Patent: Feb. 11, 2003

(54) DUAL ENDED CABLE FOR CONNECTING ELECTRONIC ARTICLE SURVEILLANCE ANTENNA WITH RFID EQUIPMENT

(75) Inventors: Clarke W. McAllister; Alexander M. McQueen, both of Eugene, OR (US)

(73) Assignee: PSC Scanning, Inc., Eugene, OR (US)

( * ) Notice: Subject to any disclaimer, the term of this patent is extended or adjusted under 35 U.S.C. 154(b) by 0 days.

(21) Appl. No.: 09/304,145

(22) Filed: May 3, 1999

(51) Int. Cl.$^7$ .................................................. G06K 7/10
(52) U.S. Cl. ............................ 235/462.01; 235/472.01; 235/472.02
(58) Field of Search ......................... 235/462.01, 472, 235/470, 491, 462.25, 462.27

(56) References Cited

U.S. PATENT DOCUMENTS

| | | | |
|---|---|---|---|
| 5,059,951 A | 10/1991 | Kaltner | 340/572 |
| 5,103,235 A | 4/1992 | Clemens | 343/742 |
| 5,142,292 A | 8/1992 | Chang | 343/742 |
| 5,241,160 A * | 8/1993 | Bashan et al. | 235/380 |
| 5,270,525 A * | 12/1993 | Ukai et al. | 235/472 |
| 5,382,784 A | 1/1995 | Eberhardt | 235/472 |
| 5,541,399 A * | 7/1996 | de Vall | 235/491 |
| 5,640,002 A | 6/1997 | Ruppert et al. | 235/472 |
| 5,837,988 A | 11/1998 | Bobba et al. | 235/467 |
| 5,907,146 A * | 5/1999 | Bridgelall et al. | 235/470 |
| 5,917,412 A | 6/1999 | Martin | 340/527.3 |
| 5,990,794 A | 11/1999 | Alicot et al. | 340/573.1 |
| 6,102,290 A * | 8/2000 | Swatz et al. | 235/462.01 |
| 6,154,135 A | 11/2000 | Kane et al. | 340/572 |
| 6,169,483 B1 | 1/2001 | Ghaffari et al. | 340/572.3 |
| 6,208,235 B1 | 3/2001 | Trontelj | 340/10.1 |
| 6,237,852 B1 | 5/2001 | Svetal et al. | 235/462.43 |
| 6,281,796 B1 | 8/2001 | Canipe et al. | 340/572.3 |

FOREIGN PATENT DOCUMENTS

| | | | |
|---|---|---|---|
| FR | 533844a1 | * 3/1993 | G06K/19/07 |
| WO | WO 0067193 | 11/2000 | |

OTHER PUBLICATIONS

Spectra–Physics VS1000 and VS1200 Scanner Level 1 Service Manual, pp. 4–31 through 4–32 (Dec. 1994).
PSC Scanning, Inc. Magellan SL Scanner and Scanner/Scale Installation and Operation Manual, pp. 1–3 through 1–6 and 2–23 through 2–26 (2001).

* cited by examiner

Primary Examiner—Michael G. Lee
Assistant Examiner—Ahshik Kim
(74) Attorney, Agent, or Firm—Stoel Rives LLP

(57) ABSTRACT

A data reading system includes a dual ended cable for connecting an electronic article surveillance (EAS) antenna located on a data reader with a separate radio frequency identification (RFID) reading device. The dual ended cable has different termination impedances at either end, and has an impedance matching network at one end. The impedance matching network matches the impedance of the EAS antenna to the RFID reading device, thereby eliminating signal reflection and enabling the data reader to be used with the RFID reading equipment.

9 Claims, 6 Drawing Sheets

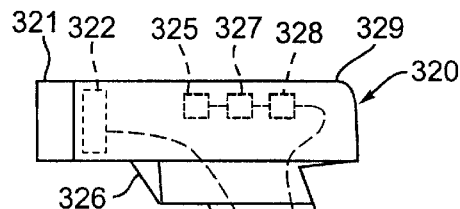
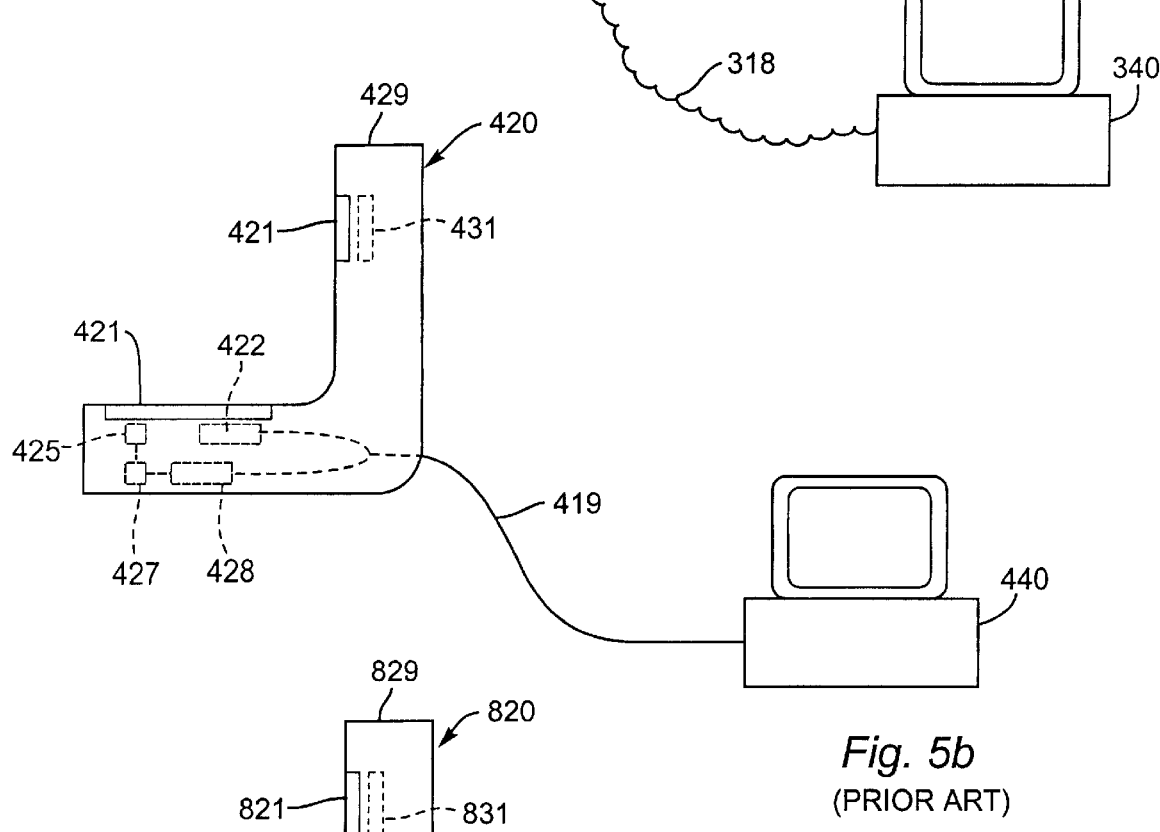
Fig. 5a (PRIOR ART)
Fig. 5b (PRIOR ART)
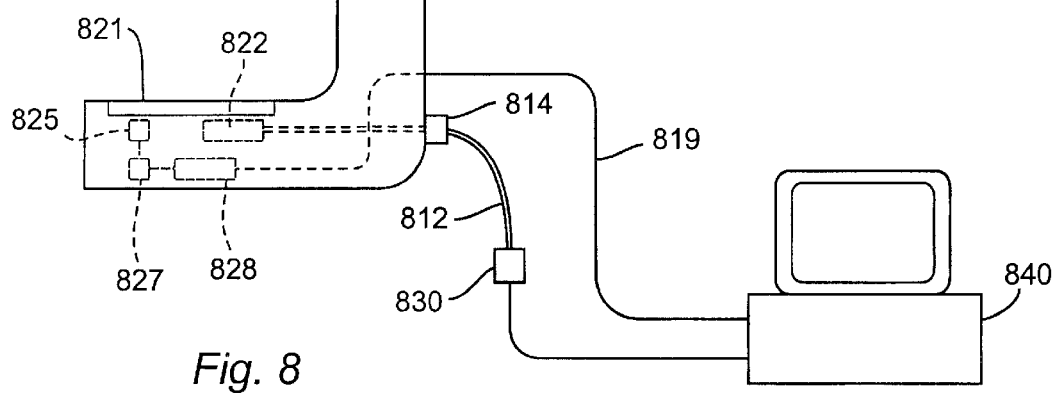
Fig. 8

DUAL ENDED CABLE FOR CONNECTING ELECTRONIC ARTICLE SURVEILLANCE ANTENNA WITH RFID EQUIPMENT

BACKGROUND OF THE INVENTION

The field of the present invention generally relates to optical systems for data reading and radio frequency identification (RFID) systems for remote identification of physical objects. More particularly, the field of the present invention relates to methods and apparatus for enabling a data reader with an electronic article surveillance (EAS) antenna to read RFID data.

Optical reading systems are widely used to read data in the form of bar codes or other encoded symbols printed on various objects. These systems may be used in a wide variety of applications, such as inventory control and point-of-sale transactions in retail stores.

Optical reading systems may employ an optical reader that illuminates a bar code and detects light reflected from the bars and spaces of the code, although such systems may be configured to operate in ambient light conditions. In one type of optical reading system, an optical beam of light produced by a laser diode is used to scan the bar code symbol. The bars of the code absorb light, while the spaces of the code reflect light. The resulting pattern of reflected light is detected by circuitry within the optical reader. The reflected light can be detected by a sensor such as a photocell, photodiode, CCD array, or CMOS array sensor.

After the bar code data is received by the optical reader, the sensor signal may be subject to filtering, amplification, digitization and decoding. The detected signal may be transmitted to a processor or decoder located within the optical reader, or to a separate device such as a personal computer. In systems where the signal is conveyed to a separate device, the optical reader may be connected to the external data processor by means of cables or via a wireless communication link. The wireless communication link can be implemented using radio frequency (RF) equipment or infrared (IR) transmitters and receivers, for example.

In retail stores, stationary optical reading systems may be set up at check-out stands and may be built into a horizontal check-out counter, so that items to be purchased can be placed on a counter, deck or conveyor, and then moved through an optical reading area. An example of a stationary optical reading system is described in U.S. Pat. No. 5,837,988, hereby incorporated by reference as if set forth fully herein. Alternatively, the optical reader may be a handheld device, in the shape of a wand or gun. An example of a handheld data reader is described in U.S. Pat. No. 5,475,206, hereby incorporated by reference as if set forth fully herein. Typically, in operation these handheld devices are pointed or aimed at the retail item, so that a wide range of information, including price, may be read from the object.

Some optical readers are equipped with EAS antennas, enabling them to be used with EAS systems. EAS systems are typically used to prevent theft, by detecting tags or hidden labels located on any unpurchased items, as they pass through the exit of a retail store. In a common system, a transmitter sends a radio frequency (RF) signal to a tag, and the tag sends back a response signal, which is detected by a receiver. In some systems, the transmitter and receiver may be combined into one single antenna.

If a tag is detected by the EAS system, an alarm will be triggered indicating that a item that has not yet been purchased, is being taken from the premises. To prevent the alarm from being triggered by a purchased item, the tag must be removed or deactivated at time of purchase. In some systems the tag must be physically removed from the item, while in others, the tag may be disabled electronically. Once the tag is removed or disabled, the purchased item will no longer be detectable by the EAS system. Thus, in a common EAS system a retail item is either detected or not detected.

RFID systems can be used to identify retail items by reading information stored on tags or hidden labels on the items. Such systems do not merely detect the presence or non-presence of a tag. Instead, these systems can be used to remotely identify physical objects by the response signal sent back by the tag.

An RFID system typically employs at least two components, a "transponder" or "tag," which is attached to the physical item to be identified, and a "reader," which sends an electromagnetic signal to the transponder and then detects a response. Typically, the reader emits a RF signal, which is received by the transponder, after the transponder comes within an appropriate range. In response, the transponder then sends its information via a modulated RF signal back to the reader. The reader detects this modulated signal, and can identify the transponder by decoding the modulated signal. After identifying the transponder, the reader can either store the decoded information or transmit the decoded signal to a computer.

In a conventional RFID system the transponder may be either "passive" or "active." A passive transponder is usually a simple resonant circuit, consisting of an inductive coil and a capacitor. Passive transponders are generally powered by the carrier signal transmitted from the reader. Active transponders, on the other hand, require their own battery source.

An optical reader equipped with EAS antennas will not work with RFID reading systems. EAS systems typically operate at frequencies in the range of 8 to 9 MHz. However, typical operating frequencies for RFID systems are 13.56 MHz, 915 MHz and 2450 MHz. Thus, attempting to connect an optical reader equipped with an EASA antenna would lead to unacceptable distortion of the signal, including signal reflection and possible loss of data. The inventor has therefore recognized that it would be advantageous to provide a mechanism and method for allowing an RFID reader to operate with an optical reader equipped with an EAS antenna.

SUMMARY OF THE INVENTION

The present invention relates to methods and apparatus for enabling a data reader with an EAS antenna to read RFID data. In one embodiment, a dual ended cable connects an EAS antenna located on a data reader with a separate RFID reading device. The dual ended cable, has different termination impedances at either end, and includes an impedance matching network on one end. The dual ended cable preferably has a characteristic impedance of a standard value, such as 50 ohms or 75 ohms, throughout the dual ended cable, except at the end having the impedance matching network. In an exemplary embodiment, the impedance matching network has a characteristic impedance equal to that of an EAS antenna located on a data reader. The end of the dual ended cable having the impedance matching network may be connected to the EAS antenna on the data reader, and the coaxial cable may be connected to a RFID reader, thereby minimizing distortion in the signal transmission and maximizing the power transfer between the data reader and the RFID reader.

BRIEF DESCRIPTION OF THE DRAWINGS

FIG. 5a is a diagrammatic side view of a hand held data reader with an electronic article surveillance antenna as known in the prior art.

FIG. 5b is a diagrammatic side view of a fixed data reader with an electronic article surveillance antenna as known in the prior art.

FIG. 8 is a diagrammatic side view of another embodiment of a dual mode reading system, wherein an impedance matching network is attached to a fixed scanner device that uses an EAS antenna.

DETAILED DESCRIPTION OF THE PREFERRED EMBODIMENTS

Preferred embodiments will now be described with reference to the drawings.

Figure 1:
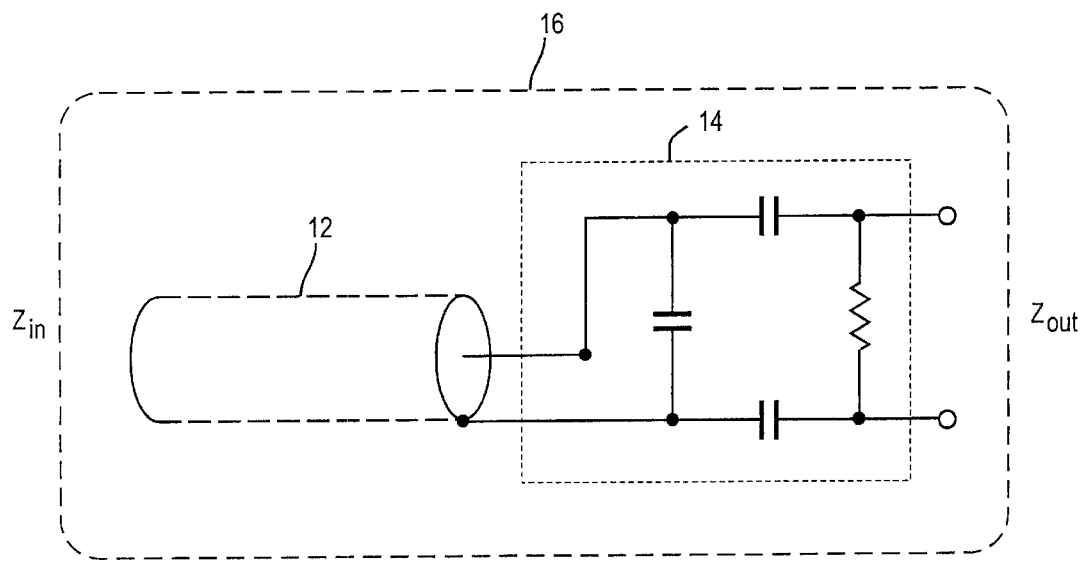
FIG. 1 is a diagrammatic side view of a dual ended cable and a circuit diagram for an impedance matching network attached to one end, according to an embodiment of the present invention.

FIG. 1 illustrates an example of a preferred dual ended cable 16 having different termination impedances at either end, and having an impedance matching network 14 at one end. In a preferred embodiment, the dual ended cable 16 also has a coaxial cable 12, attached to the impedance matching network 14, with a characteristic impedance of a standard typical in the industry. For example, the coaxial cable 12 may have a characteristic impedance of 50 ohms or, alternatively, 75 ohms.

Figure 2:
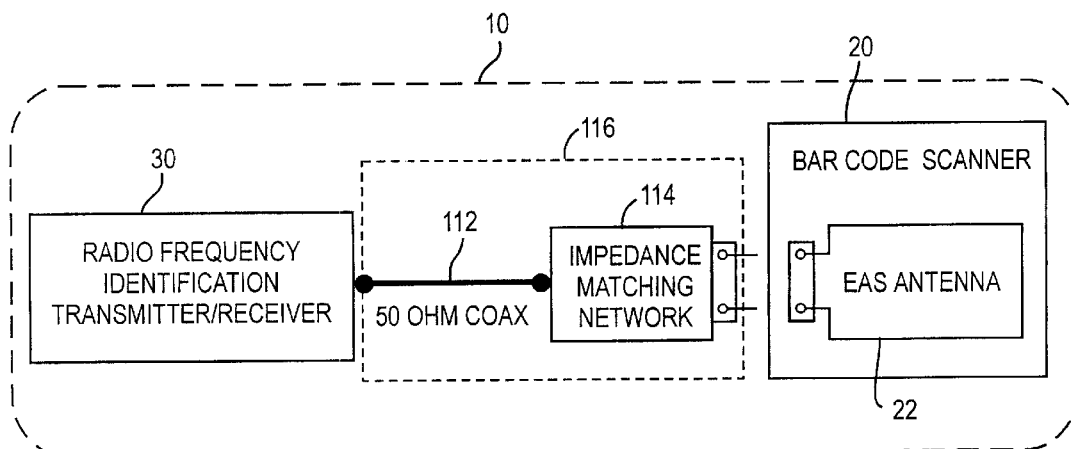
FIG. 2 is a block diagram of a dual-mode reading system employing a dual ended cable with an impedance matching network according to an embodiment of the present invention.

FIG. 2 is a block diagram of various elements of a preferred dual-mode reading system 10 in which a dual ended cable 116 with an impedance matching network 114 may be employed. In a preferred embodiment, the dual ended cable 116 has a coaxial cable 112 with a characteristic impedance of a standard value, such as 50 ohms or 75 ohms.

The end of the dual ended cable 116 having the impedance matching network 114 preferably has a characteristic impedance equal to that of an EAS antenna 22 located on a data reader 20.

The end of the dual ended cable 116 having the impedance matching network 114 may be connected to the EAS antenna 22 located on a data reader 20. In addition, the coaxial cable 112 may be connected to a RFID reader 30, thereby minimizing signal distortion and maximizing power transfer between the data reader 20 and the RFID reader 30.

The data reader 20 may contain a light source, a detector, an optical collector, and signal processing circuitry, not shown in FIG. 2, but all of which are well known in the art, for scanning an encoded symbol (such as a bar code symbol), including one-dimensional, two-dimensional or stacked bar codes, or error-resilient codes such as PDF417. An example of a data reader having such features is described in U.S. Pat. No. 5,814,803, which is assigned to the assignee of the present invention, and is hereby incorporated by reference as if set forth fully herein.

The data reader 20 also includes an EAS antenna 22, which is tuned to operate at a frequency in the range of 8 to 9 MHz. However, an RFID reader 30 typically has a much higher operating frequency, for example around 13.56 MHz, 915 MHz, or 2450 MHz. Given that the impedance of an antenna varies with frequency, it is desirable to match the impedance of the EAS antenna 22 to the impedance of the RFID reader 30 in order to maximize power transmission. If a data reader 20 is connected directly to an RFID reader 30, and the impedance of the EAS antenna 22 is not matched to the impedance of the RFID reader 30, then the mismatch in impedance will cause signal reflection, and will result in errors, loss of information, and a reduced read range.

To solve this problem, the dual ended cable 116 used to connect the EAS antenna 22 and the RFID reader 30 is advantageously outfitted with an impedance matching network 114. The general purpose of the impedance matching network 114 is to match the termination impedance of one end of the dual ended cable 116 with the characteristic impedance of the EAS antenna 22 located on the data reader 20, thereby maximizing power transfer and minimizing signal loss due to distortion.

In operation, the dual-mode reading system 10 may be activated by the user through a trigger on the data reader 20. When the trigger is pulled by the user, the data reader 20 can read a bar code by illuminating the bar code and detecting the light reflected from the bars and spaces of the code. The data reader 20 can also read a RFID tag by transmitting an electromagnetic signal and detecting a modulated response signal from the RFID tag through the EAS antenna 22. The modulated response signal is sent to the RFID reader 30 via the dual ended cable 116.

Thus, the dual-mode reading system 10 enables the user to advantageously read bar codes and RFID tags with one device. Furthermore, the RFID reader 30 can be used with the EAS antenna 22 located on the data reader 20. Finally, the dual-mode system 10 only requires a dual ended cable 116 with an impedance matching network 114 to be added in between the data reader 20 and the RFID reader 30, in accordance with the above embodiments.

FIGS. 3a–d illustrate various alternative circuit topologies that may be used as an impedance matching network 114 in accordance with a particular embodiment of the dual-mode reading system 10. The values of the circuit components in each of the circuit topologies shown in FIGS. 3a–d have been selected to provide proper impedance matching for an EAS antenna 122 having an operating frequency of 8 to 9 MHz, and a RFID reader 130 having an operating frequency of 13.56 MHz. However, if other operating frequencies for the EAS antenna 122 and RFID reader 130 were used, it is believed that one skilled in the art could readily select values for the circuit components of the impedance matching network 114 to appropriately match the impedances.

In the particular examples of FIGS. 3a–d, each of the circuit topologies yields a quality factor (Q) of 28, where the center frequency (F) is equal to 13.56 MHz and the bandwidth (BW) is equal to 484 KHz; and where quality factor (Q) is the ratio of frequency (F) to bandwidth (BW) and is governed by the equation:

$$Q=F/BW$$

In each of the circuit topologies in FIGS. 3a–d, the quality factor, which is related to the bandwidth of signals to be conveyed, is selected according to constraints imposed by FCC guidelines for the frequencies of interest.

The circuit topologies illustrated in FIGS. 3a–d are generally comprised of passive circuit elements, including various capacitive and/or inductive elements. As shown in the first embodiment of FIG. 3a, an RFID reader 130 is connected to an EAS antenna 122 through an impedance matching network 114a. The impedance matching network 114a comprises an inductor 167 connected in series with a capacitor 168. Another inductor 169 connects from the node 166 between inductor 167 and capacitor 168, to a pass-through signal line 165. Inductor 167 may have a value of, for example, 207.5 nH, capacitor 168 may have a value of, for example, 156.5 pF, and inductor 169 may have a value of, for example, 122.7 nH.

Figure 3A:
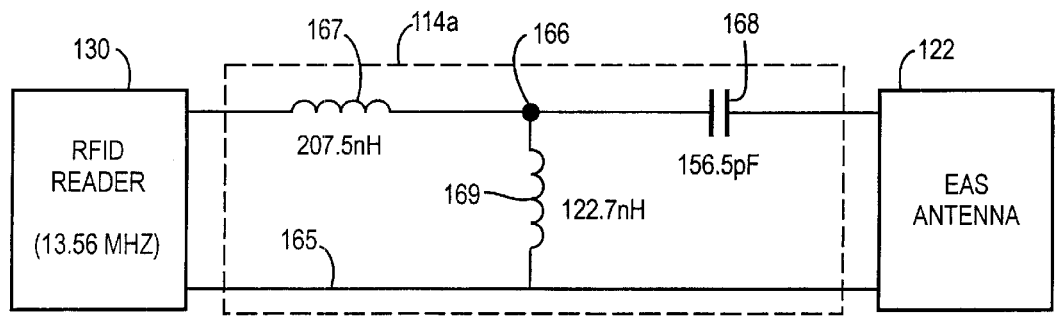
FIGS. 3a–d illustrate various alternative circuit topologies that may be used for an impedance matching network in a particular embodiment as described herein.
Figure 3B:
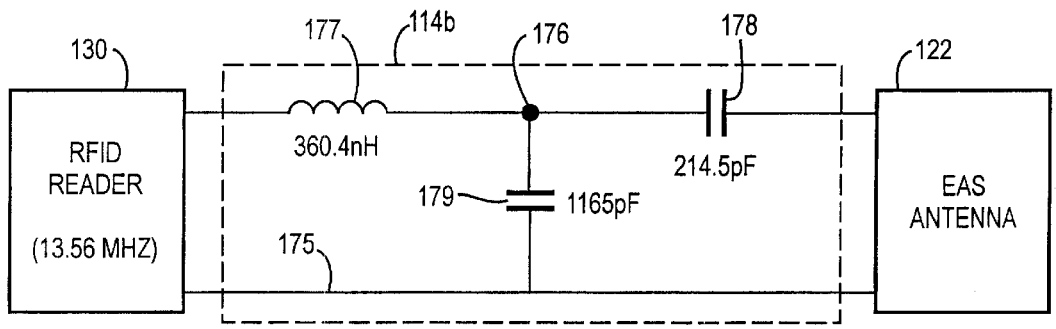

In the example shown in FIG. 3b, the RFID reader 130 is connected to the EAS antenna 122 through an impedance matching network 114b comprising an inductor 177 connected in series with a capacitor 178. Another capacitor 179 connects from the node 176 between inductor 177 and the first capacitor 178, to a pass-through signal line 175. Inductor 177 may have a value of, for example, 360.4 nH, capacitor 178 may have a value of, for example, 214.5 pF, and capacitor 179 may have a value of, for example, 1165 pF.

Figure 3C:
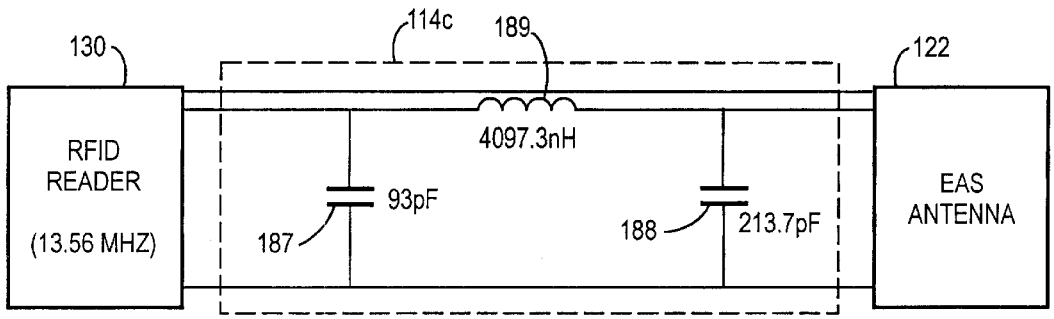

In the example shown in FIG. 3c, the RFID reader 130 is connected to the EAS antenna 122 through an impedance matching network 114c comprising a first capacitor 187 and a second capacitor 188 connected in parallel, with one end of each capacitor 187, 188 connected across an inductor 189, and the other end of each capacitor 187, 188 tied together. Capacitor 187 may have a value of, for example, 93 pF, capacitor 188 may have a value of, for example, 213.7 pF, and inductor 189 may have a value of, for example, 4097.3 nH.

Figure 3D:
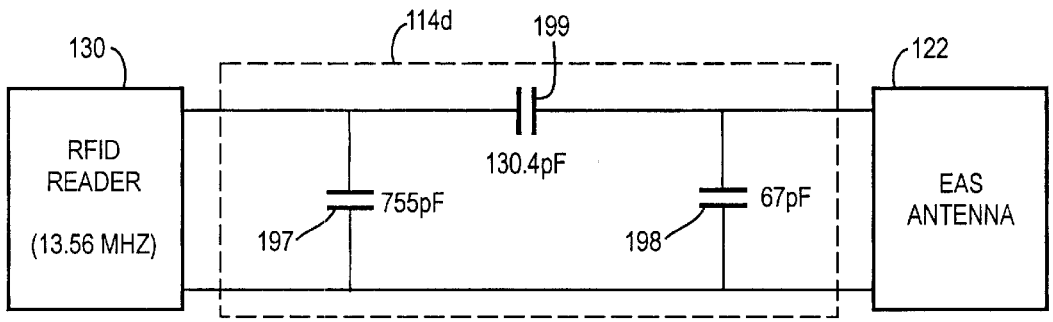

In the example shown in FIG. 3d, the RFID reader 130 is connected to the EAS antenna 122 through an impedance matching network 114d comprising a first capacitor 197 and a second capacitor 198 connected in parallel, with one end of each capacitor 197, 198 connected across a third capacitor 199, and the other end of each capacitor 197, 198 tied together. Capacitor 197 may have a value of, for example, 755 pF, capacitor 198 may have a value of, for example, 67 pF, and capacitor 199 may have a value of, for example, 130.4 pF.

In the embodiments depicted in FIGS. 3a–d, the specific values of each of the circuit elements are not intended to limit the invention in any way, and are merely exemplary. Each of the embodiments shown in FIGS. 3a–d, as described before, functions to match the impedance of the RFID reader 130 with the impedance of the EAS antenna 122.

FIGS. 4a–d illustrate various additional alternative circuit topologies that may be used as an impedance matching network 214 according to another embodiment of the dual-mode reading system 10. The values of the circuit components in each of the circuit topologies shown in FIGS. 3a–d have been selected to provide proper impedance matching for an EAS antenna 222 having an operating frequency of 8 to 9 MHz, and an RFID reader 230 having an operating frequency of 915 MHz.

In the particular examples of FIGS. 4a–d, each of the circuit topologies yields a quality factor (Q) of 35.2, where the center frequency (F) is equal to 915 MHz and the bandwidth is equal to 26 MHz. Alternatively, where the center frequency (F) is equal to 2440 MHz, and the bandwidth (BW) is equal to 83.5 MHz, other similar circuit topologies may be used for the impedance matching network 214, in order to yield a quality factor (Q) of 29.2. Where the RFID reader 230 transmits and receives wideband signals through the EAS antenna 222, equalization circuits may be required.

Figure 4A:
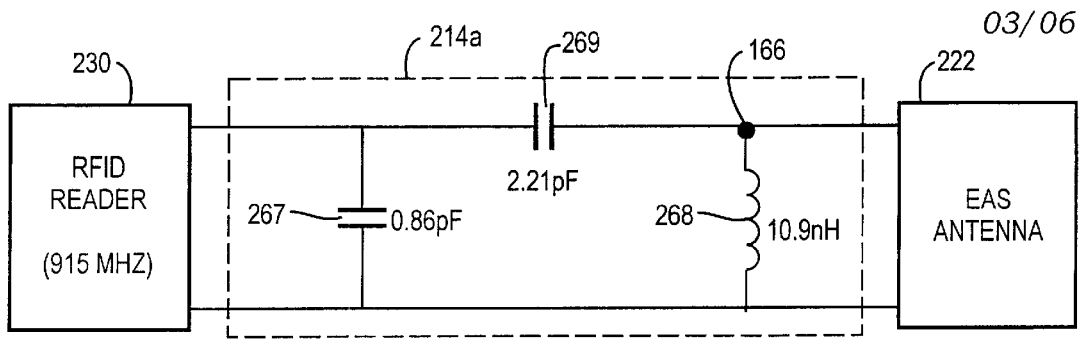
FIGS. 4a–d illustrate other alternative circuit topologies that may be used for an impedance matching network in another embodiment as described herein.

As shown in the embodiment of FIG. 4a, an RFID reader 230 is connected to an EAS antenna 222 through an impedance matching network 214a. The impedance matching network 214a comprises a capacitor 267 and an inductor 268 connected in parallel, with one end of the capacitor 267 and inductor 268 connected across another capacitor 269, and the other end of the capacitor 267 and inductor 268 tied together. Capacitor 267 may have a value of, for example, 0.86 pF, inductor 268 may have a value of, for example, 10.9 nH, and capacitor 269 may have a value of, for example, 2.21 pF.

Figure 4B:
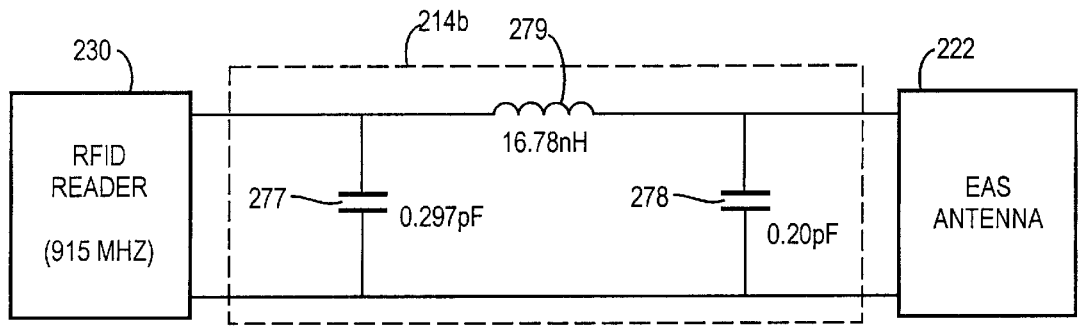

In the example shown in FIG. 4b, the RFID reader 230 is connected to the EAS antenna 222 through an impedance matching network 214b comprising a first capacitor 277 and a second capacitor 278 connected in parallel, with one end of each capacitor 277, 278 connected across an inductor 279, and the other end of each capacitor 277, 278 tied together. Capacitor 277 may have a value of, for example, 0.297 pF, capacitor 278 may have a value of, for example, 0.20 pF, and inductor 279 may have a value of, for example, 16.78 nH.

Figure 4C:
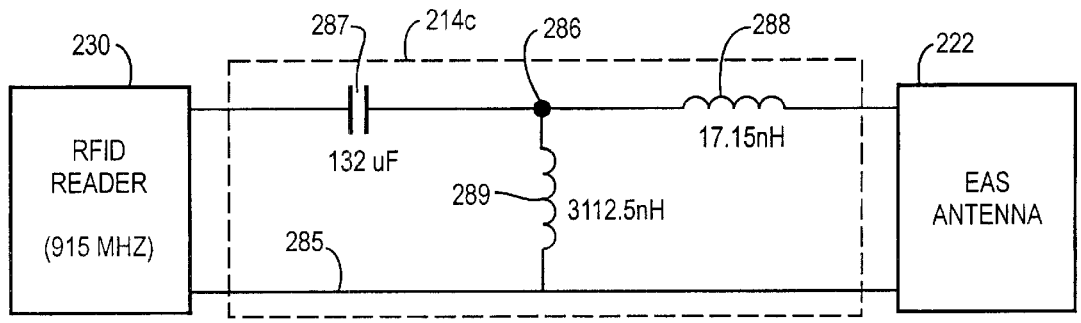

In the example shown in FIG. 4c, the RFID reader 230 is connected to the EAS antenna 222 through an impedance matching network 214c comprising a capacitor 287 connected in series with an inductor 288. Another inductor 289 connects from the node 286 between inductor 288 and capacitor 287, to a pass-through signal line 285. Capacitor 287 may have a value of, for example, 132 uF, inductor 288 may have a value of, for example, 17.15 nH, and inductor 289 may have a value of, for example, 3112.5 nH.

Figure 4D:
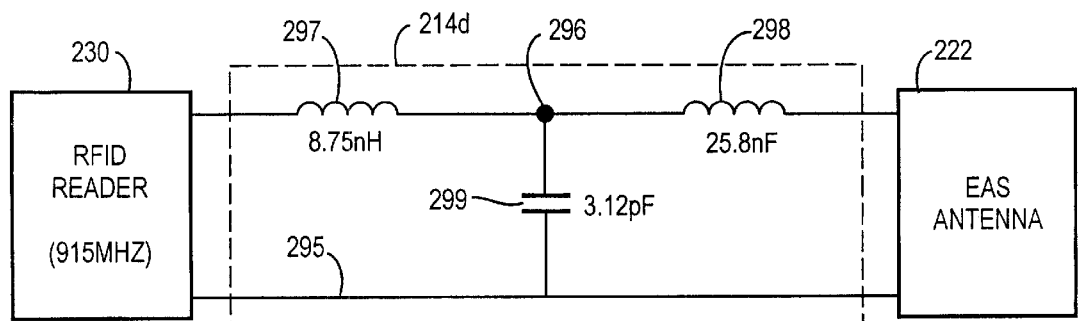

In the example shown in FIG. 4d, the RFID reader 230 is connected to the EAS antenna 222 through an impedance matching network 214d comprising a first inductor 297 connected in series with another inductor 298. A capacitor 299 connects from the node 296 between first inductor 297 and the second inductor 298, to a pass-through signal line 295. Inductor 297 may have a value of, for example, 8.75 nH, inductor 298 may have a value of, for example, 25.8 nH, and capacitor 299 may have a value of, for example, 3.12 pF.

As with the embodiments depicted in FIGS. 3a–d, the specific values of the circuit elements shown in the embodiments of FIGS. 4a–d are not intended to limit the invention in any way, and are merely exemplary.

While FIGS. 3a–d and FIGS. 4a–d illustrate examples of circuit topologies usable in an impedance matching network according to various embodiments of the invention as described herein, the actual circuit topology selected for the impedance matching network depends on a variety of preferences and trade-offs which would be understood by one skilled in the art given the disclosure herein. For example, it may be desirable in certain applications to limit the number of inductors, or to minimize the size of capacitors used in the impedance matching network.

FIG. 5a illustrates a typical hand held data reader 320, with a window 321, an EAS antenna 322, an optical collector 325, a photosensitive detector 327 and an internal bar code processor 328, located within a housing 329, as known in the prior art. The EAS antenna 322 and the internal bar code processor 328 are connected to a coiled cable 318 through a snap-on connector 324. The data reader 320 is activated by a trigger 326, and sends data to a host computer 340.

FIG. 5b illustrates a typical stationary data reader 420, with a window 421, an EAS antenna 422, an optical collector 325, a photosensitive detector 427, a mirror 431, and an internal bar code processor 428, located within a housing 429, as known in the prior art. The EAS antenna 422 and the internal bar code processor 428 are connected to a cable 419. The data reader 420b sends data to a host computer 440.

Figure 6:
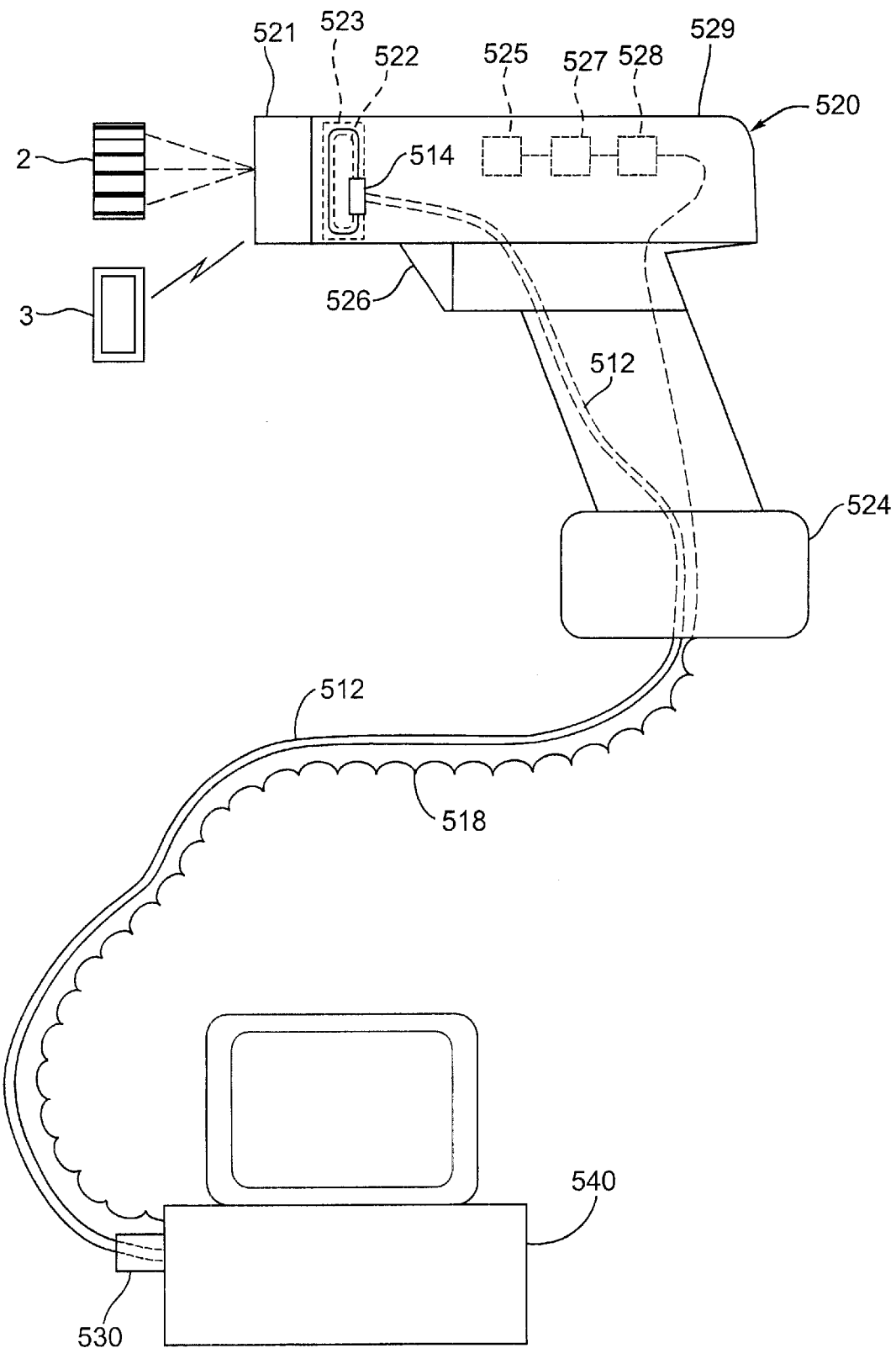
FIG. 6 is a diagrammatic side view of one embodiment of a dual mode reading system including a hand held scanner, wherein an impedance matching network is located within the housing of the hand held scanner.

FIG. 6 illustrates one embodiment of a dual preferred mode reading system in accordance with the inventive techniques as disclosed herein. As illustrated in FIG. 6, a hand held data reader 520 has an optical collector 525, a photosensitive detector 527, and an internal bar code processor 528 located within a housing 529 with a window 521. In addition, the hand held data reader 520a has an EAS antenna 522 that is printed on a circuit board 523 and located behind the window 521 of the data reader 520. The EAS antenna is connected to an impedance matching network 514, which is also on the printed circuit board 523. The impedance matching network 514 is attached to a coaxial cable 512, which is connected to a RFID reader 530. The RFID reader 530 is attached to a host computer 540. The internal bar code processor 528 is connected the host computer 540 via a coiled cable 518.

The hand held data reader 520 may be activated by a trigger 526, and can read bar codes 2 and RFID tags 3. The EAS antenna 522 can transmit an electromagnetic signal, and can detect a response signal sent back by the RFID tag 3. The impedance matching network 514 matches the impedances of the EAS antenna 522 and the RFID reader 530, thereby enabling the EAS antenna to send signals through the coaxial cable 512 to the RFID reader 530, and then to the host computer 540.

Figure 7A:
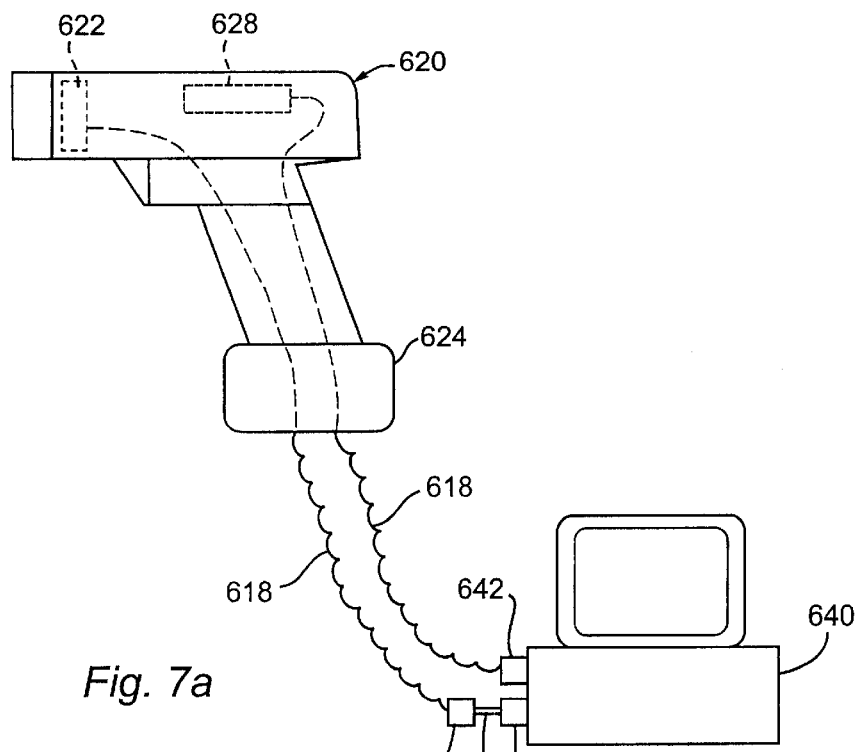
FIG. 7a is a diagrammatic side view of another embodiment of a dual mode reading system, wherein separate cables are used for conveying signals from an optical data reader and from an EAS antenna to a host device.

FIG. 7a illustrates another embodiment of a dual mode reading system. As illustrated in FIG. 7a, a hand held data reader 620 includes an EAS antenna 622 and an internal bar code processor 628, which are connected to separate coiled cables 618 through a snap-on connector 624. An impedance matching network 614 matches the impedance of the EAS antenna 622 with the impedance of an RFID reader 630, thereby enabling the EAS antenna 622 to send signals to an RFID reader 630 and then on to a host computer 640 through a coaxial cable 612. The internal bar code processor 628 sends data to the host computer 640 through a separate coiled cable 618, which is attached to the host computer 640 via a RS232 connector 642.

Figure 7B:
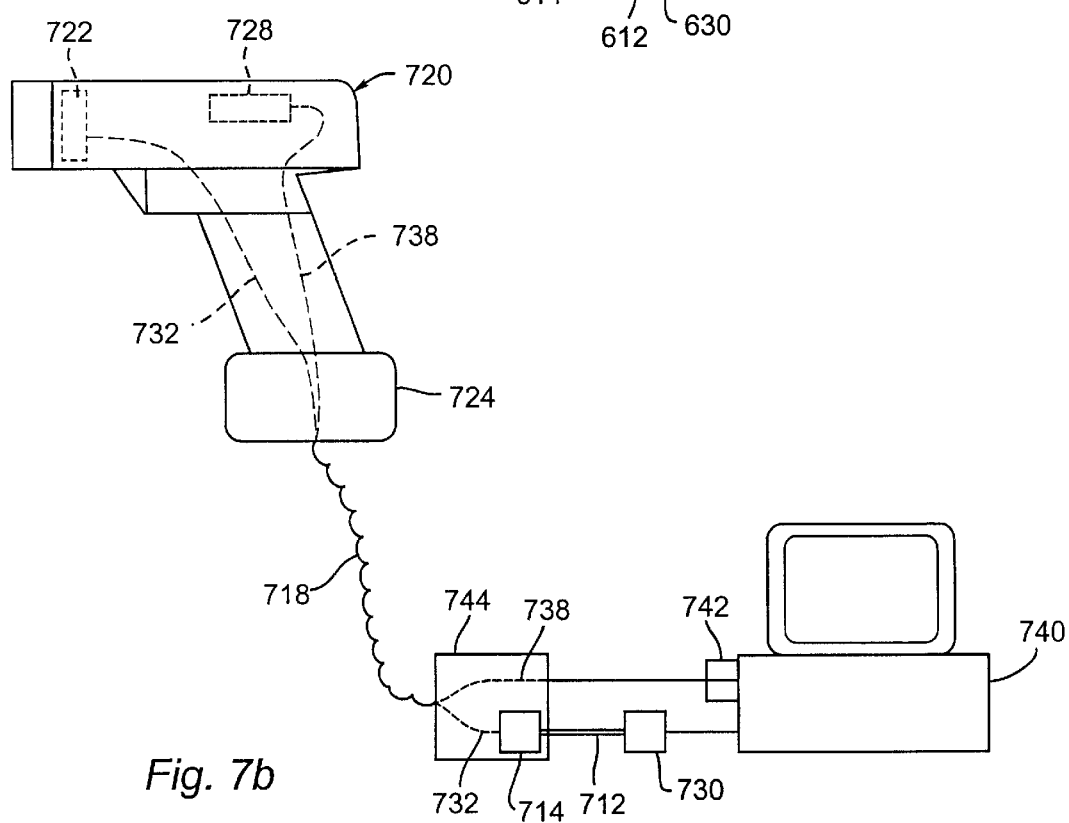
FIG. 7b is a diagrammatic side view of another embodiment of a dual mode reading system, wherein a single common cable is used for conveying signals from an optical data reader and an EAS antenna to a host device.

FIG. 7b depicts another embodiment of a dual mode reading system. As illustrated in FIG. 7b, a hand held data reader 720 includes an EAS antenna 722 and an internal bar code processor 728, both of which are connected to the same coiled cable 718 through a snap-on connector 724. The coiled cable 718 is attached to a custom connector 744, which houses an impedance matching network 714 on a dual ended cable 716. The EAS antenna connecting wire 732 is separated from the bar code processor connecting wires 738, and is attached to the impedance matching network 714 inside the custom connector 744. A coaxial cable 712 connects the impedance matching network 714 to an RFID reader 730, which is connected to a host computer 740. The bar code processor connecting wires 738 are attached to an RS232 connector 42. In operation, the impedance matching network 714 matches the impedance of the EAS antenna 722 with the impedance of the RFID reader 730, allowing improved transmission and reception of signals over the EAS antenna 722.

FIG. 8 illustrates another embodiment of a dual mode reading system. In the embodiment illustrated in FIG. 8, a stationary data reader 820 includes a window 821, an EAS antenna 822, an optical collector 825, a photosensitive detector 827, a mirror 831, and an internal bar code processor 828, located within a housing 829. The EAS antenna 822 is connected to an impedance matching network 814, which is attached to the data reader 820. A coaxial cable 812 connects the impedance matching network 814 with an RFID reader 830. The RFID reader 830 may be connected to a host computer 840. The internal bar code processor 828 may be connected to the host computer 840 through a separate cable 819. In operation, the impedance matching network 814 matches the impedance of the EAS antenna 822 with the impedance of the RFID reader 830, allowing improved transmission and reception of signals over the EAS antenna 827.

While embodiments and applications of the present invention have been shown and described, it will be apparent to one skilled in the art that other modifications, alternatives and variations are possible without departing from the inventive concepts set forth herein. Therefore, the invention is intended to embrace all such modifications, alternatives and variations that fall within the scope and spirit of the appended claims.

What is claimed is:

1. A data reading system comprising:
    a data reader comprising
        a housing having a window,
        a photosensitive detector located within said housing,
        an optical collector for directing light on said photosensitive detector,
        processing circuitry connected to an output of said photosensitive detector, and
        an EAS antenna adapted to operate in a first frequency range suitable for electronic article surveillance (EAS) functionality, said EAS antenna having a characteristic impedance;
    a radio frequency identification (RFID) reader, said RFID reader having an antenna connector adapted to receive signals in a second frequency range different from the first frequency range;
    a first cable connection between said data reader and a host device;
    a second cable connection between said data reader and said antenna connector of said RFID reader, said second cable connection providing a signal path between said antenna and said RFID reader; and
    an impedance matching network connected to one end of said second cable connection, said impedance matching network having a characteristic impedance matching the characteristic impedance of said EAS antenna.

2. The data reading system of claim 1, wherein said first cable connection and said second cable connection are physically located in separate cables.

3. The data reading system of claim 1, wherein said first cable connection and said second cable connection are physically located within the same dual ended cable.

4. The data reading system according to claim 3 wherein said dual ended cable has a characteristic impedance of 50 ohms at one end of said dual ended cable, and a characteristic impedance substantially equal to that of said EAS antenna at the other end of said dual ended cable.

5. The data reading system according to claim 1 wherein said RFID reader has a transceiver operating frequency centered at either 13.56 MHz, 915 MHz, or 2450 MHz.

6. The data reading system according to claim 1 wherein said RFID reader transmits and receives a wideband signal, said RFID reader further comprising an equalization circuit.

7. The data reading system according to claim 1, wherein said impedance matching network is physically integrated within a cable connector at one end of said second cable connection.

8. A method of converting a data reader equipped with a single conductor, single loop antenna adapted to operate at frequencies suitable for electronic article surveillance (EAS) functionality, into a data reader equipped with an RFID reader, comprising the steps of:

attaching the ends of the single conductor, single loop antenna to a first end of an impedance matching network, attaching a second end of the impedance matching network to a first end of a cable, and attaching a second end of the cable to an RFID reader, wherein the impedance matching network matches the characteristic impedance of the single conductor, single loop antenna to the impedance of the RFID reader.

9. The method of claim 8, wherein said RFID reader has a transceiver operating frequency centered at either 13.56 MHz, 915 MHz, or 2450 MHz.

* * * * *